United States Patent [19]

Taff

[11] 4,372,474
[45] Feb. 8, 1983

[54] FULL FUNCTION IN-PLACE WELD HEAD
[75] Inventor: James T. Taff, Simi Valley, Calif.
[73] Assignee: Dimetrics, Inc., Diamond Springs, Calif.
[21] Appl. No.: 211,359
[22] Filed: Nov. 28, 1980
[51] Int. Cl.³ .............................................. B23K 9/00
[52] U.S. Cl. .................................... 228/29; 219/60 A
[58] Field of Search ............................ 228/28, 29, 27; 219/60 A

[56] References Cited
U.S. PATENT DOCUMENTS

| | | | |
|---|---|---|---|
| 3,235,912 | 5/1973 | Nikolaev et al. | 228/29 |
| 3,840,170 | 10/1974 | Arikawa et al. | 228/29 |
| 4,144,992 | 3/1979 | Omae et al. | 228/102 |
| 4,145,593 | 3/1979 | Merrick et al. | 219/60 A |
| 4,213,555 | 7/1980 | Minkiewicz et al. | 228/29 |

Primary Examiner—Nicholas P. Godici
Assistant Examiner—M. Jordan
Attorney, Agent, or Firm—Ralph B. Pastoriza

[57] ABSTRACT

A pipe clamping structure is arranged to clamp an in-place pipe to be welded. A welding mechanism in turn is coupled to the pipe clamping structure for rigid guided movement in directions parallel to itself towards and away from the clamping structure in an axial direction along the pipe. The welding mechanism in turn supports a horseshoe-shaped weld head support rotor which receives the pipe in the horseshoe opening and is arranged to rotate about the pipe axis. A torch head is carried on the horseshoe rotor so that a 360° weld can be achieved and simultaneously, the welding mechanism can be oscillated back and forth by the rigid guidance and alignment coupling with the clamp structure. In addition, the torch head is held on a link plate to the rotor, the link plate being swingable to vary the arc gap and thus provide appropriate voltage control. The overall dimensions of the welding apparatus as measured in an axial direction are not greater than twice the diameter of the largest size pipe which can be accommodated so that in-place welding can take place in relatively awkward situations in a completely automatic manner.

6 Claims, 9 Drawing Figures

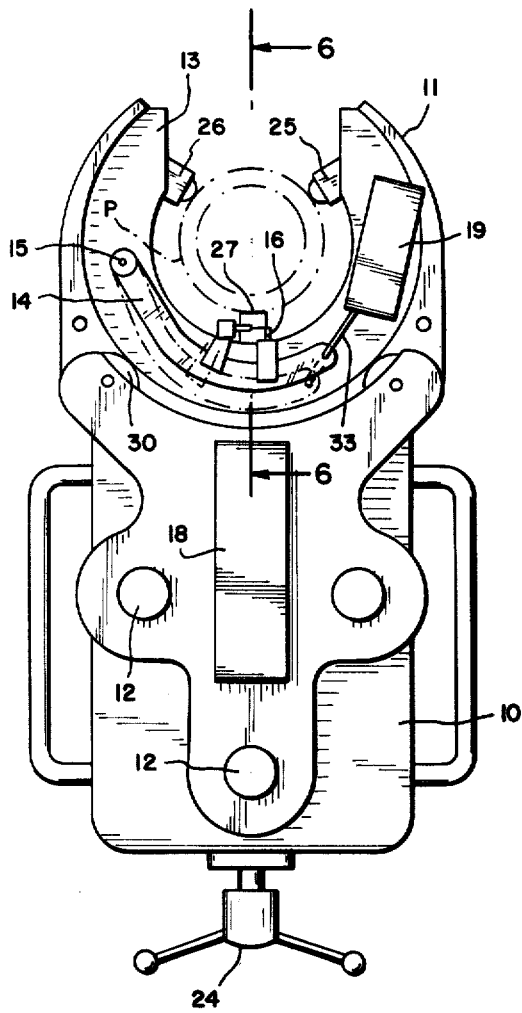
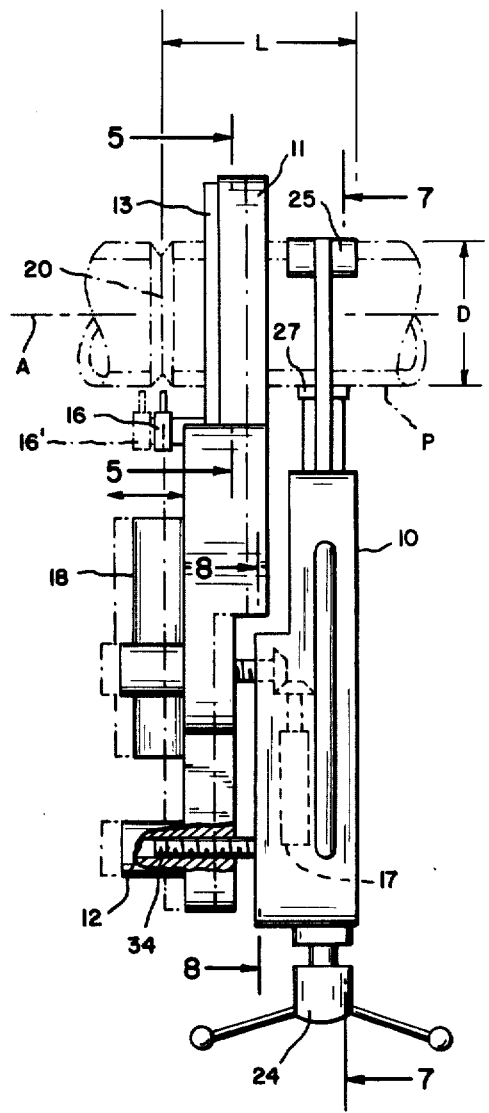
FIG. 3
FIG. 4

FULL FUNCTION IN-PLACE WELD HEAD

This invention relates generally to welding systems and more particularly to a full function in-place weld head permitting automatic welding of in-place pipes wherein surrounding structure prohibits the use of conventional automatic welding equipment.

BACKGROUND OF THE INVENTION

Automatic welding systems for effecting a 360° weld about either the exterior or interior of pipes are well known. Generally these systems will include a welding mechanism having a travelling carriage which will support a torch head and cause it to actually orbit around the exterior of the pipe where an exterior weld is to be made or in those instances where an interior weld is to be made, the travelling carriage will move about the inside of a pipe.

These known machines also include mechanism for causing the carriage to oscillate back and forth as it progresses over 360° so that an oscillating path for the torch is effected and thereby provides for proper heating of the material and proper welding with only one 360° sweep. Also, controls are provided for varying the arc gap of the torch head relative to the weld to provide for automatic voltage control. In addition, automatic wire feed rate controls are provided in TIG systems, the various relative motions all being programmed to provide for a high quality controlled weld.

While the above-described automatic welding systems are highly successful, they cannot readily be used for relatively small pipe welding operations; that is, small pipes that may vary in diameter from ½ inch to 3 inches and particularly they cannot be used for pipes that are already in place, where the surrounding pipe connections can block the entry of the welding mechanism.

As a consequence of the foregoing, it has been necessary to hand weld some of the smaller pipe sections and thus the advantage of consistency and proper weld quality realizable with automatic welding equipment is lost.

While it might be possible to automate some of the welding movements such as an orbiting of the weld torch head about the pipe without requiring too much space, there has never been available a full function automatic welding system for the small diameter pipes in in-place applications which provides for appropriate oscillation of the torch head across the weld path as it progresses about the pipe, nor has there been available any automatic system for providing other weld functions.

BRIEF DESCRIPTION OF THE PRESENT INVENTION

With the foregoing in mind, the present invention contemplates the provision for the first time of a full function in-place welding system capable of effecting automatic welds for in-place pipes in environments which prohibit the use of conventional automatic welding equipment.

More particularly, the present invention comprises a pipe clamping structure having spaced clamping shoes for engaging and clamping an in-place pipe to hold the structure stationary relative to the pipe. A welding mechanism surrounds a portion of the pipe adjacent to the pipe clamping structure and is supported by parallel movement control means to the clamping structure for guided axial movement back and forth along the axial direction of a pipe clamped in the clamping structure relative to the clamping structure. A horseshoe-shaped weld head support rotor in turn is mounted in the welding mechanism for rotational movement in its own plane over 360° about a pipe received in the mechanism. Additionally, a link plate is pivoted to one side of the horseshoe shaped rotor and serves to carry a welding torch head such that swinging movement of the link plate about its pivot moves the torch head in a generally normal direction further from and closer to the axis of a pipe clamped in the clamping structure. First, second and third motors are programmed to provide for oscillating the torch head back and forth on either side of the weld path as the torch head follows a 360° weld path about the pipe held in the clamping structure. Also, the torch head can be moved towards and away from the weld to control the arc gap and thus provide for a voltage control as the other movements are taking place thereby resulting in a controlled high quality weld carried out in a fully automatic manner.

The overall length of the welding system as measured between the clamping shoes and the torch head in the direction of the pipe axis is less than twice the diameter of the largest sized pipe which can be accommodated in the system, so that access to awkward areas to be welded can be had as compared to accessibility of conventional automatic welding equipment.

BRIEF DESCRIPTION OF THE DRAWINGS

A better understanding of this invention as well as many further features and advantages thereof will be had by now referring to the accompanying drawings in which:

FIG. 3 is a front elevational view of the welding apparatus of FIG. 1;

FIG. 4 is a side elevational view taken in the direction of the arrows 4—4 of FIG. 3;

DETAILED DESCRIPTION OF THE PREFERRED EMBODIMENT

Referring to the righthand portion of FIG. 1, there is shown at 10 a pipe clamping structure having spaced clamping shoes as will be subsequently described for engaging and clamping an in-place pipe to hold the structure 10 stationary relative to the pipe. A welding mechanism designated generally by the numeral 11 surrounds a portion of the pipe adjacent to the pipe clamping structure and is supported to the pipe clamping structure by appropriate parallel movement control means components of which are indicated at 12. As will also become clearer as the description proceeds, the control means 12 provides for guided axial movement in planes parallel to itself of the welding mechanism 11 relative to the clamping structure 10, back and forth in an axial direction along a pipe held in the clamping structure.

Figure 1:
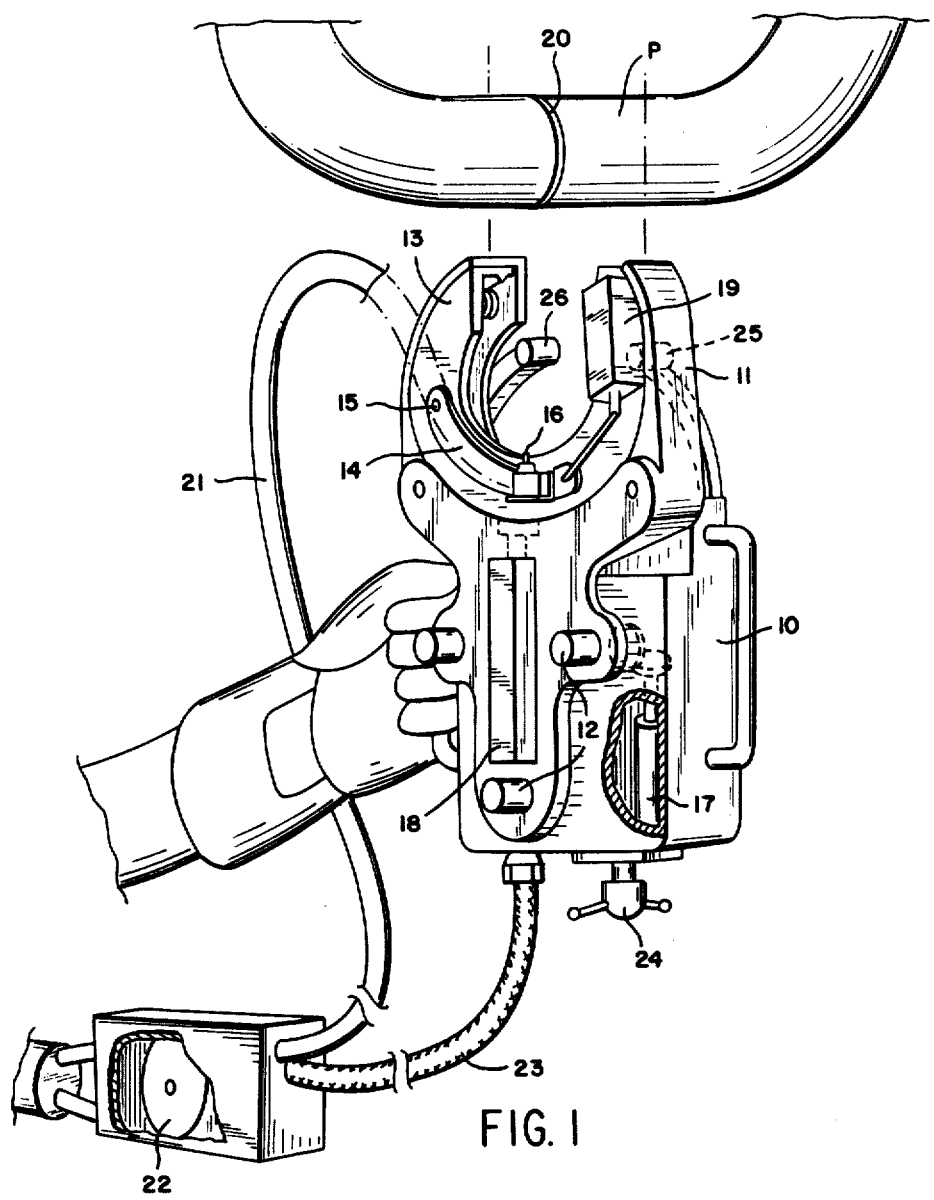
FIG. 1 is an overall perspective view of the full function in-place weld head of this invention showing a typical in-place pipe exploded above the mechanism on which a welding path has been defined.

Still referring to FIG. 1, there is shown in the upper portion a horseshoe-shaped weld head support rotor 13 mounted in the welding mechansim for rotation by movement in its own plane over 360° about a pipe received in the horseshoe opening. Details of this mounting for the rotor will also be subsequently described.

Finally, there is provided a link plate 14 pivoted at 15 to one side of the horseshoe-shaped rotor 13 and serving to mount a torch head 16. The arrangement is such that swinging movement of the link plate about the pivot 15 will move the torch head in a generally normal direction relative to the axis of a pipe held in the clamping structure and passing through the horseshoe-shaped rotor.

A first motor 17 shown in the broken away portion of the clamping structure 10 is provided for operating the parallel movement control means 12. A second motor 18 shown on the welding mechanism 11 serves to rotate the weld head supporting rotor 13 to cause the torch head 16 to orbit about a pipe to be welded when positioned in the clamping structure and passing through the horseshoe rotor 13. A third motor 19 in turn is carried on the weld head support rotor and coupled to the link plate 14 to swing this plate about its pivot point and thereby move the torch head 16 closer to and further from the weld to provide control of the arc gap and thus voltage control.

With the foregoing arrangement as described thus far, the three motors can be programmed so that the torch head 16 is oscillated to either side of the weld path by the first motor 17 as the rotor 13 is rotated by the second motor 18 over 360°. Also, simultaneously the arc gap can be controlled by the third motor 19 cooperating with the link plate 14 supporting the torch head 16. It will thus be seen that three major functions in providing for a high quality weld which can be consistently repeated in an automatic manner can be carried out.

In FIG. 1 there is shown exploded above the welding apparatus a pipe P on which a weld path 20 to be welded is defined. It will be noted that this pipe extends from curved portions on either side of the weld path 20. However, because of the compact design of the welding system of the present invention, the pipe P can readily be clamped by the clamping structure 10 and a 360° weld carried out without interference from the end curved portions of the pipe P.

Appropriate wire feed for the system of FIG. 1 in the embodiment disclosed is provided by a flexible feed wire guide 21 connected to a feed drive motor 22 which can be located remote to the welding head so as to minimize the bulk and overall dimensions of the weld head. Welding power for the arc itself as well as the various motors is supplied through a cable 23 from a remote power source.

As depicted in FIG. 1, the entire welding apparatus can be held by appropriate handles on the clamping structure with one hand. Of course once the clamping structure has thoroughly engaged the pipe, the entire structure is self-supporting and can be controlled from a remote control box having appropriate electrical connections through the cable 23 to the various motors and other components. In this latter operation of clamping the structure, there is shown at 24 a manually operable screw which serves to operate an appropriate camming mechanism within the clamping structure 10 and thereby cause appropriate clamping arms terminating in clamping shoes, two of which are shown at 25 and 26 engaging the pipe P.

Figure 2:
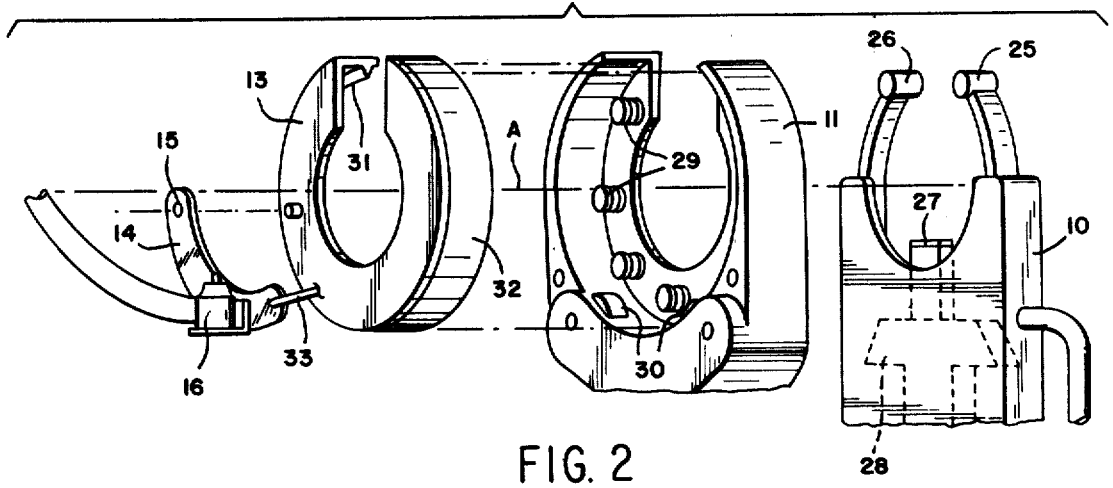
FIG. 2 is a fragmentary exploded perspective view of upper portions of the welding apparatus illustrated in FIG. 1 useful in explaining features of the invention.

All of the foregoing as well as further features will be more readily understood by now referring to FIGS. 2, 3 and 4.

Considering first the exploded view of FIG. 2, the third clamping shoe for the clamping structure 10 is illustrated at 27 and is simultaneously operated with the clamping shoes 25 and 26 by an appropriate camming means indicated in phantom lines at 28. The exact manner in which clamping takes place will be described subsequently. Suffice it to say at the moment that operation of the screw 24 described in FIG. 1 will raise the camming means 28 to cause the camming shoes 25, 26 and 27 to move radially inwardly simultaneously equal distances so that different diameter pipes can be clamped without changing their axes relative to the welding mechanism. In FIG. 2, the pipe axis for the exploded elements is indicated at A.

Still referring to FIG. 2, the welding mechanism 11 is shown by itself wherein essentially a bearing plate of similar horseshoe shape to that of the rotor 13 described in FIG. 1 includes a plurality of guide rollers 29 having V grooves in their peripheries mounted at points lying on the circumference of a circle whose center corresponds with the axis A of a pipe held in the clamping structure. Also shown as part of the clamping mechanism 11 are two drive rollers 30 spaced below and on either side of the axis A.

The horseshoe-shaped weld head support rotor 13 described in FIG. 1 is shown exploded away from the welding mechanism 11 in FIG. 2 and has an undercut portion defining a lip 31 following a circular path up to the opposite sides of the horseshoe opening. This lip is receivable in the V grooves of the guide rollers 29 so that the rotor 13 is supported for rotary movement in the welding mechanism and is held by the guide rollers to follow axial movements of the welding mechanism 11 relative to the clamping structure 10.

Rotor 13 as shown in FIG. 2 has an outer smooth periphery 32 following a circular path up to the side periphery 32 openings of the horseshoe shape. This periphery 32 seats on the drive rollers 30 described in the welding mechanism 11, the spacing between the drive rollers being greater than the horseshoe opening spacing so that the rotor is engaged at all times by at least one of the drive rollers 30 throughout a 360° rotation.

Finally, to the extreme left of FIG. 2 there is illustrated exploded away from the rotor 13 the link plate 14 and pivot 15 for the torch head 16. A further coupling member 33 is illustrated which connects to the motor 19 described in FIG. 1 to provide for the swinging movement of the link plate 14 about the pivot 15 to move the torch head 16 towards and away from the axis A.

Most of the foregoing described features are illustrated in the front and side views of FIGS. 3 and 4 wherein the same reference numerals designate corresponding parts. In the upper portion of FIG. 3, there is indicated by the phantom lines a pipe held within the clamping shoes 25, 26 and 27. Further, there is shown the torch head 16 and wire feed manipulator both held on the link plate 14. Also illustrated are the rollers 30 engaging the outer smooth periphery of the horseshoe shaped rotor 13 to drive the same.

In FIG. 4, there is shown the pipe P in phantom lines being held by the clamping structure 10 within the shoes 25 and 27. Also indicated in FIG. 4 by the phantom lines is the movement of the welding mechanism 11 relative to the clamping structure 10 as by means of the parallel movement control means 12. Essentially, and as will be described in further detail subsequently, the components 12 for this parallel movement control means constitute threaded nuts fixed to the welding mechanism 11 and arranged to receive three lead screws one of which is shown at 34 in the broken away portion. These lead screws, as will be described subsequently, extend from points defining the vertices of a equilateral triangle in the clamping structure 10 and all three lead screws are caused to be rotated simultaneously in the same direction to effect the desired aligned axial movement with the welding mechanism assuming successive positions parallel to itself.

Figure 5:
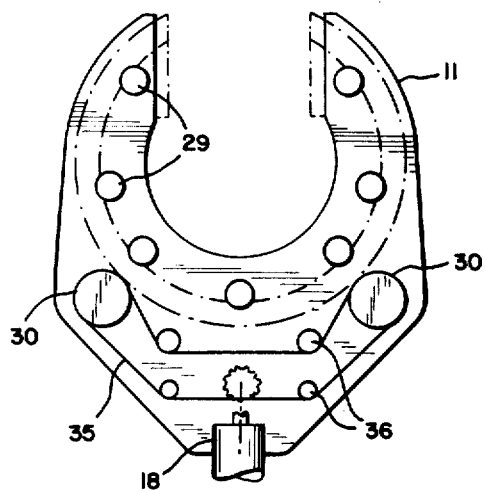
FIG. 5 is a fragmentary view taken in the direction of the arrows 5—5 of FIG. 4.

Referring now to FIG. 5, which is a cross section in the direction of the arrows 5—5 of FIG. 4 of the welding mechanism 11 the various guide rollers are shown on a circular path indicated by the dashed line. Also shown are the drive rollers 30 the same being coupled together by a chain 35 passing over appropriate guide pulleys such as 36 so that the chain can be driven by the motor 18.

Figure 6:
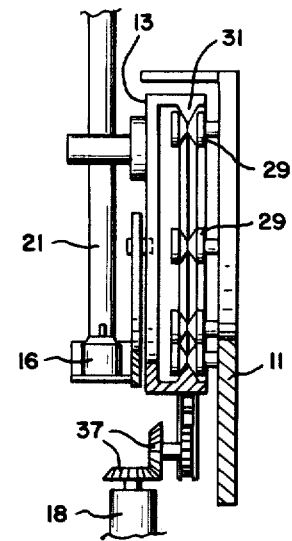
FIG. 6 is a fragmentary cross section taken in the direction of the arrows 6—6 of FIG. 3.

Referring to the cross section of FIG. 6, this driving of the chain 35 is effected through appropriate bevel gears 37.

In FIG. 6 the manner in which the horseshoe shaped rotor 13 has its undercut lip 31 supported in the V grooves of the guide rollers 29, as heretofore described with respect to FIG. 2, is shown.

Figure 7:
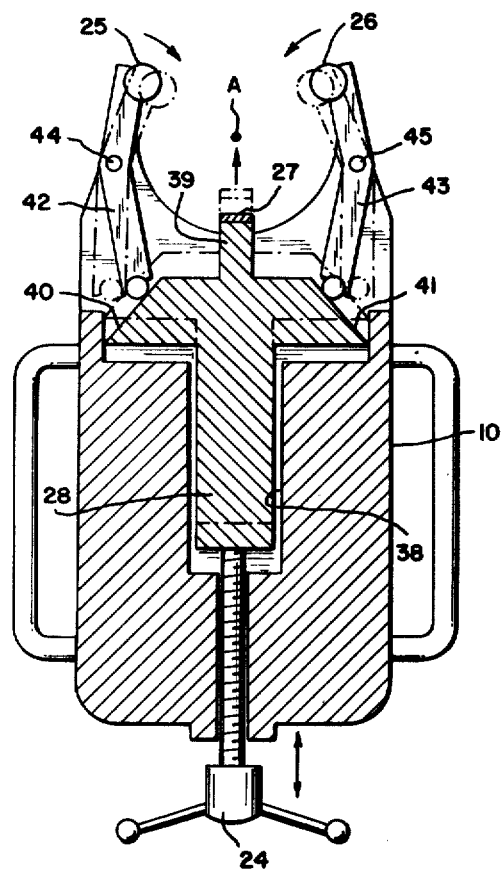
FIG. 7 is a cross section taken in the direction of the arrows 7—7 of FIG. 4.

Referring now to FIG. 7, further details of the operation of the camming member 28 as briefly described in FIG. 2 will become evident. As shown, the clamping structure includes a vertical guide channel 38 within which the camming member 28 is received for vertical movement. The top surface of the camming member 28 terminates in a support 39 for the central shoe 27 and in sloping camming shoulders 40 and 41 on either side of the central shoe support 39. Spaced arm members 42 and 43 are centrally pivoted at 44 and 45 at points above the camming shoulders 40 and 41. The arrangement is such that the lower ends of the arms 42 and 43 engage the camming shoulders 40 and 41, the upper ends of these arms terminating in the remaining two clamping shoes 25 and 26.

With the foregoing description in mind, it will now be evident that when the manual screw means 24 is threaded upwardly into the clamping structure 10, the camming member 28 will be urged upwardly in the guide channel 38 to thereby raise the central shoe 27 and simultaneously spread the lower ends of the arms 42 and 43 apart to cause the remaining clamping shoes 25 and 26 at the other ends of the arms to close together and thereby effect the referred-to equal inner radial movement of all of the shoes 25, 26 and 27. In FIG. 7, the axis A of a pipe held in the clamp is indicated and it will be understood that because of the equal inward radial movement of the clamping shoes 25, 26 and 27, this axis A will remain in the same position for different diameter pipes, all as described heretofore.

Figure 8:
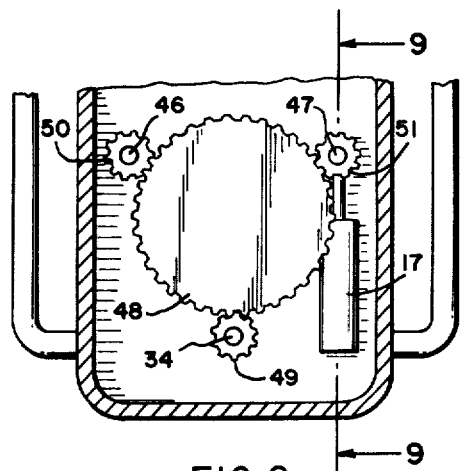
FIG. 8 is a fragmentary cross section taken in the direction of the arrows 8—8 of FIG. 4; and, FIG. 9 is a cross section taken in the direction of the arrows 9—9 of FIG. 8.
Figure 9:
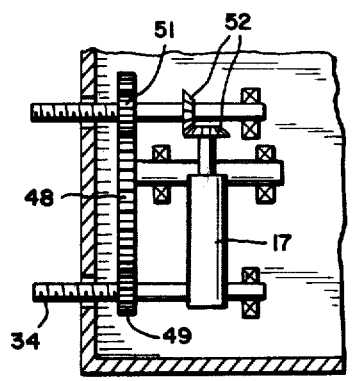

FIGS. 8 and 9 shows details of the parallel movement control means for effecting the desired oscillatory movement of the welding mechanism relative to the clamping structure.

As described heretofore, there are provided three screws one of which has already been indicated at 34 in FIG. 4. The other screws are shown at 46 and 47 in FIG. 8, the three screws all being rotatably mounted in the clamping structure with their axes extending from points defining the vertices of an equilateral triangle in directions parallel to and below the axis of a pipe held in the clamping structure. The welding mechanism as is clear from FIGS. 3 and 4 includes three fixed nuts 12 in positions to receive the screws 34, 46 and 47.

As shown in FIG. 8, a central gear 48 is positioned in the clamping structure for cooperation with three outer gears 49, 50 and 51 secured to the screws 34, 46 and 47 respectively, and also in threaded engagement with peripheral points of the central gear 48.

With the foregoing described gear arrangement, rotation of any one of the gears will rotate all of the other gears. Further, it will be evident that the three outer gears will always be rotated in a like direction which is opposite in sense to the rotation of the central gear 48.

FIG. 9 shows how the first motor 17 within the clamping structure connects to drive one of the gears shown in FIG. 8. The particular gear selected is gear 51 and coupling to this gear is by way of bevel gears 52. When motor 17 which is a reversible motor is energized in one direction, it will cause gear 51 to rotate which in turn will rotate the central gear 48 and thereby effect rotations of the outer gears 49 and 50. The outer gears are all of the same diameter and the screws 34, 46 and 47 to which they connect are all of the same pitch. Thus, all three screws are rotated simultaneously in like directions and will thus effect the desired parallel movement of the welding mechanism to itself. Even though there may be unequal loading or torques acting on the welding mechanism, a smooth movement of the welding mechanism parallel to itself is assured as a consequence of the triangular configuration and the fact that three screws are all driven.

Summarizing from all of the foregoing, it will become evident that the present invention has provided an extremely useful full function in-place weld head. Important automatic control functions, specifically, oscillation control of the torch head across the weld path, simultaneous moving of the torch head over the pipe throughout 360° at a controlled rate, and arc gap distance control are all realizable in the present invention. In addition, wire feed rate can be controlled as the welding process is carried out.

Finally, because of the compact configuration providing for an overall axial length of the welding structure of less than twice the largest diameter pipe contemplated to be clamped and welded by the present invention, in-place pipe welding can be effected where the environmental conditions are such as would block conventional welding equipment, all as set forth.

I claim:
1. A full function, in-place weld head including, in combination:
 (a) a pipe clamping structure having spaced clamping shoes for engaging and clamping an in-place pipe to hold the structure stationary relative to said pipe;
 (b) a welding mechanism surrounding a portion of the pipe adjacent to said pipe clamping structure;
 (c) parallel movement control means coupling said welding mechanism to said clamping structure for guided back and forth movement in an axial direction along said pipe relative to said clamping structure, said parallel movement control means including three rotatably mounted screws in said clamping structure having axes extending from points defining the vertices of an equilateral triangle in directions extending from the clamping structure parallel to and below the axis of a pipe held in the clamping structure, said welding mechanism having three fixed threaded nuts in positions to receive said screws; a central gear in said clamping structure and three outer gears at said points secured to said screws to rotatably mount the same, said three outer gears being in threaded engagement with said central gear so that rotating any one of the gears will rotate all the other gears to effect said guided back and forth movement;

(d) a horseshoe-shaped weld head supporting rotor mounted in said welding mechanism for rotational movement in its own plane over 360° about a pipe received therein;

(e) a link plate pivoted to one side of the horseshoe-shaped rotor;

(f) a welding torch head mounted on said link plate such that swinging movement of said link plate about its pivot moves said torch head in a generally normal direction further from and closer to the axis of said pipe;

(g) a first motor in said pipe clamping structure coupled to rotate one of said gears of said parallel movement control means and constituting a reversable motor so that by periodically reversing the direction of rotation of one gear, the welding mechanism is caused to oscillate towards and away from the clamping structure to thereby effect movement of the torch head back and forth across the weld path;

(h) a second motor on said welding mechanism for rotating said weld head support rotor; and (i) a third motor carried on said weld head support rotor for swinging said link plate about its pivot point, whereby programmed operation of said first, second and third motors enables oscillating the torch head back and forth on either side of the weld path as a 360° weld path is followed about the pipe held in said clamping structure and wherein the torch head can be moved towards and away from the weld path as required for arc gap voltage control so that there is automatically provided a controlled high quality weld about the pipe.

2. A full function, in-place weld head including, in combination:

(a) a pipe clamping structure having spaced clamping shoes for engaging and clamping an in-place pipe to hold the structure stationary relative to said pipe;

(b) a welding mechanism surrounding a portion of the pipe adjacent to said pipe clamping structure;

(c) parallel movement control means coupling said welding mechanism to said clamping structure for guided back and forth movement in an axial direction along said pipe relative to said clamping structure;

(d) a horseshoe-shaped weld head supporting rotor mounted in said welding mechanism for rotational movement in its own plane over 360° about a pipe received therein;

(e) a link plate pivoted to one side of the horseshoe-shaped rotor;

(f) a welding torch head mounted on said link plate such that swinging movement of said link plate about its pivot moves said torch head in a generally normal direction further from and closer to the axis of said pipe;

(g) a first motor in said pipe clamping structure for operating said parallel movement control means;

(h) a second motor on said welding mechanism for rotating said weld head support rotor; and (i) a third motor carried on said weld head support rotor for swinging said link plate about its pivot point, whereby programmed operation of said first, second and third motors enables oscillating the torch head back and forth on either side of the weld path as a 360° weld path is followed about the pipe held in said clamping structure and wherein the torch head can be moved towards and away from the weld path as required for arc gap voltage control so that there is automatically provided a controlled high quality weld about the pipe, said welding mechanism including a plurality of guide rollers having V grooves in their peripheries mounted at points lying on the circumference of a circle whose center corresponds with the axis of a pipe held in said clamping structure, said horseshoe-shaped weld head support rotor having an undercut portion defining a lip following a circular path up to the opposite sides of the horseshoe opening, said lip being receivable in the V-groove of the guide rollers so that the rotor is supported for rotary movement in said welding mechanism and is held by the guide rollers to follow the axial movements of the welding mechanism relative to the clamping structure, said welding mechanism further including drive rollers spaced on either side of and below the axis of a pipe held in the clamping structure, said horseshoe-shaped weld head support rotor having an outer smooth periphery following a circular path up to the side opening of the horseshoe shape for seating on the drive rollers, the spacing between the drive rollers being greater than the horseshoe opening spacing so that the rotor is engaged at all times by at least one of the drive rollers throughout a 360° rotation; chain belt means connecting said drive rollers, said second motor being coupled to drive said belt means so that said drive rollers are simultaneously driven at equal rotational rates.

3. A full function, in-place weld head including, in combination:

(a) a pipe clamping structure having spaced clamping shoes for engaging and clamping an in-place pipe to hold the structure stationary relative to said pipe;

(b) a welding mechanism surrounding a portion of the pipe adjacent to said pipe clamping structure;

(c) parallel movement control means coupling said welding mechanism to said clamping structure for guided back and forth movement in an axial direction along said pipe relative to said clamping structure;

(d) a horseshoe-shaped weld head supporting rotor mounted in said welding mechanism for rotational movement in its own plane over 360° about a pipe received therein;

(e) a link plate pivoted to one side of the horseshoe-shaped rotor;

(f) a welding torch head mounted on said link plate such that swinging movement of said link plate about its pivot moves said torch head in a generally normal direction further from and closer to the axis of said pipe;

(g) a first motor in said pipe clamping structure for operating said parallel movement control means;

(h) a second motor on said welding mechanism for rotating said weld head support rotor; and (i) a third motor carried on said weld head support rotor for swinging said link plate about its pivot point, whereby programmed operation of said first, second and third motors enables oscillating the torch head back and forth on either side of the weld path as a 360° weld path is followed about the pipe held in said clamping structure and wherein the torch head can be moved towards and away from the weld path as required for arc gap voltage control so that there is automatically provided a controlled high quality weld about the pipe, said spaced clamping shoes for said pipe clamping structure being three in number spaced at 120° from each other, said pipe clamping structure including manually operable camming means for engaging the shoes and causing equal inward radial movement of the shoes for enabling clamping of pipes of different diameters without shifting the axial position of the pipes relative to said welding mechanism, said manually operable camming means including a vertical guide channel; a camming member in said guide channel terminating at its top surface in a central shoe comprising one of said three clamping shoes and sloping camming shoulders on either side of said central shoe; spaced arm members centrally pivoted at points above said camming shoulders so that the lower ends of the arms engage the camming shoulders, the upper ends of the arms terminating in the remaining two clamping shoes; and manually operable screw means below the camming member for urging the camming member upwardly in said guide channel to thereby raise said central shoe and simultaneously spread the lower ends of the arms to move the latter mentioned clamping shoes closer together and thereby effect said equal inner radial movement of said shoes.

4. The subject matter of claim 1, including a flexible wire feed means passing to said rotor for feeding weld wire to said torch head; and a fourth motor connected to said flexible wire feed at a remote point from said rotor for feeding said weld wire at a controlled rate.

5. The subject matter of claim 1, in which said spaced clamping shoes for said pipe clamping structure are three in number spaced at 120° from each other, said pipe clamping structure including manually operable camming means for engaging the shoes and causing equal inward radial movement of the shoes for enabling clamping of pipes of different diameters without shifting the axial position of the pipes relative to said welding mechanism.

6. The subject matter of claim 1, in which the length between the clamping shoes of said clamping structure and the torch head in the welding mechanism as measured in the axial direction of the largest diameter pipe capable of being accommodated in the clamping structure and welding mechanism, is less than twice the diameter of said pipe whereby the clamping structure and welding mechanism can be utilized in welding short in-place pipe portions terminating in curved parts normally blocking the use of conventional automatic welding equipment.

* * * * *